US011093602B2

(12) United States Patent
Sato

(10) Patent No.: US 11,093,602 B2

(45) Date of Patent: Aug. 17, 2021

(54) INFORMATION PROCESSING APPARATUS, METHOD FOR INFORMATION PROCESSING APPARATUS, AND PROGRAM STORAGE MEDIUM

(71) Applicant: CANON KABUSHIKI KAISHA, Tokyo (JP)

(72) Inventor: Tetsuya Sato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 272 days.

(21) Appl. No.: 16/185,280

(22) Filed: Nov. 9, 2018

(65) Prior Publication Data

US 2019/0156020 A1 May 23, 2019

(30) Foreign Application Priority Data

Nov. 22, 2017 (JP) ............................ JP2017-225133

(51) Int. Cl.

*G06F 21/45* (2013.01)
*G06F 21/86* (2013.01)
(Continued)

(52) U.S. Cl.

CPC .............. *G06F 21/45* (2013.01); *G06F 21/86* (2013.01); *H04L 9/0866* (2013.01); (Continued)

(58) Field of Classification Search

CPC ............ H04L 63/0861; G06K 9/00006; G06K 9/00892; G06K 9/00597; G06K 2009/00932

See application file for complete search history.

(56) References Cited

U.S. PATENT DOCUMENTS 10,075,437 B1 * 9/2018 Costigan ............... G06F 21/316
10,163,105 B1 * 12/2018 Ziraknejad ......... G06Q 20/3274
(Continued)

FOREIGN PATENT DOCUMENTS

| | | | |
|---|---|---|---|
| CN | 107222373 | A | 9/2017 |
| JP | 2017103546 | A | 6/2017 |
| JP | 2017152880 | A | 8/2017 |

OTHER PUBLICATIONS

Extended European Search Report issued in European Appln. No. 18205978.2 dated Jan. 18, 2019.
(Continued)

*Primary Examiner* — Christopher C Harris
(74) *Attorney, Agent, or Firm* — Rossi, Kimms & McDowell LLP

(57) ABSTRACT

A mobile terminal performs a user's log-in processing using biometric information read by a biometric information sensor, creates a private key required for authentication processing performed when a service on a network is used and a public key corresponding to the private key, stores the created private key with being associated with the biometric information read at the time of the log-in processing in a storage, and issues a request for registering an authentication information ID corresponding to the biometric information and a public key corresponding to the private key stored in the storage with being associated with the biometric information in the service.

13 Claims, 13 Drawing Sheets

(51) Int. Cl.

| | |
|---|---|
| ***H04L 29/06*** | (2006.01) |
| ***H04L 9/30*** | (2006.01) |
| ***H04L 9/08*** | (2006.01) |
| *G06K 9/00* | (2006.01) |

(52) U.S. Cl.

CPC .............. *H04L 9/0894* (2013.01); *H04L 9/30* (2013.01); *H04L 63/0861* (2013.01); *G06F 2221/2117* (2013.01); *G06K 9/00006* (2013.01); *G06K 9/00221* (2013.01); *G06K 9/00597* (2013.01); *G06K 9/00892* (2013.01); *G06K 2009/00932* (2013.01)

(56) References Cited

U.S. PATENT DOCUMENTS

| | | | | |
|---|---|---|---|---|
| 10,182,040 | B2 * | 1/2019 | Hu | H04W 12/0609 |
| 10,705,894 | B2 * | 7/2020 | Jeon | H04L 9/3297 |
| 2007/0106895 | A1 | 5/2007 | Huang et al. | |
| 2013/0246281 | A1 * | 9/2013 | Yamada | H04L 9/3231 705/71 |
| 2014/0189779 | A1 * | 7/2014 | Baghdasaryan | H04L 63/0861 726/1 |
| 2014/0289833 | A1 * | 9/2014 | Briceno | H04L 63/08 726/7 |
| 2014/0337930 | A1 * | 11/2014 | Hoyos | G06F 21/34 726/4 |
| 2015/0180869 | A1 * | 6/2015 | Verma | H04L 63/0884 726/4 |
| 2015/0312041 | A1 * | 10/2015 | Choi | H04L 63/0861 713/175 |
| 2015/0348026 | A1 * | 12/2015 | Roberts | G06Q 20/40145 705/71 |
| 2016/0087957 | A1 * | 3/2016 | Shah | H04L 63/08 726/1 |
| 2017/0078100 | A1 * | 3/2017 | Kusumi | H04L 63/205 |
| 2017/0109751 | A1 * | 4/2017 | Dunkelberger | H04L 9/3226 |
| 2017/0155800 | A1 | 6/2017 | Nagasawa | |
| 2018/0101847 | A1 * | 4/2018 | Pisut, IV | G06Q 20/3227 |
| 2018/0337907 | A1 * | 11/2018 | Bhansali | H04L 63/102 |
| 2019/0124081 | A1 * | 4/2019 | Nowak | H04L 63/0892 |

OTHER PUBLICATIONS

Ahmed et al. "Smart Card Technology and the FIDO Protocols" A Smart Card Alliance Identity Council White Paper. Publication No. IDC-16001. Apr. 2016: 1-19. Cited in NPL 1.

* cited by examiner

INFORMATION PROCESSING APPARATUS, METHOD FOR INFORMATION PROCESSING APPARATUS, AND PROGRAM STORAGE MEDIUM

BACKGROUND OF THE INVENTION

Field of the Invention

The present invention relates to a technique for providing a secure authentication method and improving usability for a user in a network service.

Description of the Related Art

In recent years, Fast Identity Online (FIDO) as a new authentication system including biometric authentication has become available. In the case of biometric information such as a fingerprint and a vein pattern used for a biometric authentication, leaks of confidential information becomes terminal because the biometric information is not able to be rewritten unlike in conventional passwords for ID/password authentication.

On the other hand, FIDO performs registration processing in advance between a device used by a user and a server which provides a web service. In the registration processing, a device which receives the provision of a service stores a private key linked with the user's biometric authentication and a server has authentication identification information linked with the biometric authentication, a public key paired with the private key, and the like registered therein. Moreover, an authentication is not performed in the server over the Internet, but in the device used by the user. In addition, an authentication result signed using the private key is transmitted on the network. That is to say, since biometric information is not transmitted on the network, it can be said that there is little risk of information leakage.

Japanese Patent Laid-Open No. 2017-103546 describes a communication system in which a mobile terminal automatically transmits terminal authentication information which is registered in its own apparatus in advance to a multi-function printer (MFP) and the MFP automatically performs a terminal authentication process by collating the terminal authentication information with regular terminal authentication information in the MFP.

However, in the communication system in Japanese Patent Laid-Open No. 2017-103546, there is the necessity of registration of the terminal authentication information for each MFP in the mobile terminal and so the registration required for each MFP to be used is time-consuming for a user. Furthermore, in the communication system in Japanese Patent Laid-Open No. 2017-103546, a biometric authentication is performed in addition to a terminal authentication at the time of using the MFP, but registration work performed in advance for the biometric authentication is not taken into consideration.

SUMMARY OF THE INVENTION

The present invention provides an information processing apparatus capable of improving usability for a user and providing a secure authentication method.

An information processing apparatus according to an embodiment of the present invention is an information processing apparatus including: an authentication module for biometric authentication, a storage unit having a tamper resistance and being configured to store a user's biometric information required when authentication processing is performed by the authentication module, a biometric information sensor configured to read biometric information, an executing unit for executing log-in processing of the user using biometric information read by the biometric information sensor, a creation unit for creating a private key required for the authentication processing performed at the time of using a service on a network and a public key corresponding to the private key, a storing unit for storing the created private key with being associated with the biometric information read at the time of the log-in processing, and a registration unit for issuing a request for registering identification information corresponding to the biometric information and the public key corresponding the private key stored in the storage unit with associating with the biometric information, in the service on the network.

Further feature of the present invention will become apparent from the following description of exemplary embodiments with reference to the attached drawings.

DESCRIPTION OF THE EMBODIMENTS

An embodiment of the present invention will be described below with reference to the drawings and the like.

The present invention relates to a mechanism in which a biometric authentication is performed through a device used by a user (information processing apparatus) when authenticating the user with respect to a service provided from an external system over a network, and as a result, the user is authenticated with respect to the service. This can be realized by registering information associated with the biometric authentication in the device used by the user such as, for example, authentication identification information and a public key, in the service in advance. Examples of such a mechanism include a fast identity online (FIDO), but it should be noted that the present invention is not limited to FIDO.

First Embodiment

<Configuration of System>

Figure 1:
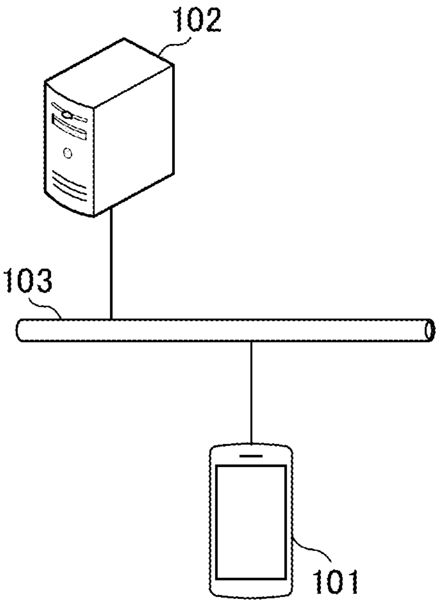
FIG. 1 is a diagram illustrating an example of an overall configuration of a system according to an embodiment of the present invention.

FIG. 1 is a diagram illustrating an example of an overall configuration of a system according to an embodiment of the present invention.

The system illustrated in FIG. 1 includes a mobile terminal 101 and a server 102. The mobile terminal 101 is an information processing apparatus such as a smartphone, a tablet, a wearable terminal and a notebook type personal computer. The server 102 is an external system which provides a service and may be constituted of a plurality of apparatuses. In addition, a part or all of the server 102 may be constructed using a resource such as a virtual machine and a storage.

The mobile terminal 101 and the server 102 are connected via a network 103. The network 103 is, for example, any of a local area network (LAN) and a wide area network (WAN) such as the Internet, a telephone circuit, a dedicated digital circuit, Asynchronous Transfer Mode (ATM) circuit, a frame relay circuit, a cable television circuit, a data broadcasting radio circuit, and the like.

Also, the network 103 may be a so-called communication network realized by a combination thereof. The network 103 includes, for example, short-range wireless communication and the like such as near field communication (NFC) and Bluetooth (registered trademark) in addition to the above-described network circuits. The network 103 needs to be able to transmit and receive data.

<Hardware Configuration of Mobile Terminal>

Figure 2A:
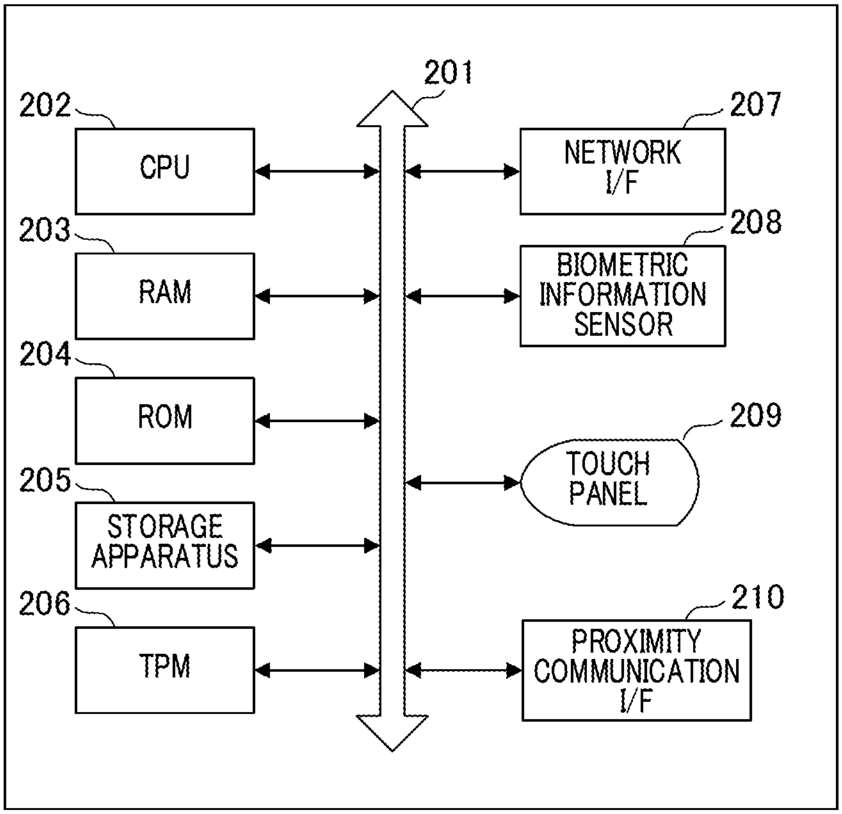
FIGS. 2A and 2B are diagrams illustrating an example of a hardware configuration of each apparatus.

FIG. 2A is a diagram illustrating an example of a hardware configuration of the mobile terminal 101.

A system bus 201 connects processing units 202 to 210 to each other. A central processing unit (CPU) 202 executes an operating system (OS) and other programs stored in a read only memory (ROM) 204 and a storage apparatus 205 and generally controls the processing units 202 to 210 via the system bus 201. The programs also include a program configured to realize flowcharts which will be described later.

The RAM 203 functions as a memory and a work area of the CPU 202. The storage apparatus 205 is a storage apparatus such as a solid state drive (SSD) and an SD memory card, and functions as an external storage apparatus. A tamper module (TPM) 206 is a storage means having a tamper-proof property which prevents stored data from being read externally and being used for the purpose of processing and storing confidential information.

In the embodiment, the TPM 206 stores biometric information itself such as information on a fingerprint, an iris, and a vein pattern read by a biometric information sensor 211 as well as various kinds of pieces of information associated with the biometric information. The various kinds of pieces of information are, for example, a feature quantity of biometric information, a private key created associated with the biometric information, and the like. Hereinafter, biometric information and various kinds of pieces of information associated with the biometric information are referred to as "biometric information."

A network interface (I/F) 207 exchanges data with an external network machine using wireless fidelity (Wi-Fi) or the like in one direction or both directions. A biometric information sensor 208 is a sensor configured to read the user's biometric information such as a fingerprint, an iris, a vein pattern, a voice, and a face, and for example, converts the user's biometric information into read signals. Note that biometric information is not limited thereto. The biometric information sensor 208 is realized using a dedicated reading device, a camera, a microphone, and the like and the mobile terminal 101 may include a plurality of biometric information sensors 208.

A touch panel 209 has two functions, i.e., display and input and displays an application screen, a keyboard screen, or the like, and when a user presses the screen with a finger or a dedicated pen, the touch panel 209 outputs the touched screen position as signal information to the outside. When an application uses the output signal information, the user can operate the application through the touch panel 209.

The biometric information sensor 208 and the touch panel 209 can be mounted to overlap and so can read the user's fingerprint information in accordance with an operation on the touch panel 209. A proximity communication I/F 210 is a network I/F corresponding to a communication method for proximity communication such as an NFC and Bluetooth.

<Internal Configuration of Server>

Figure 2B:
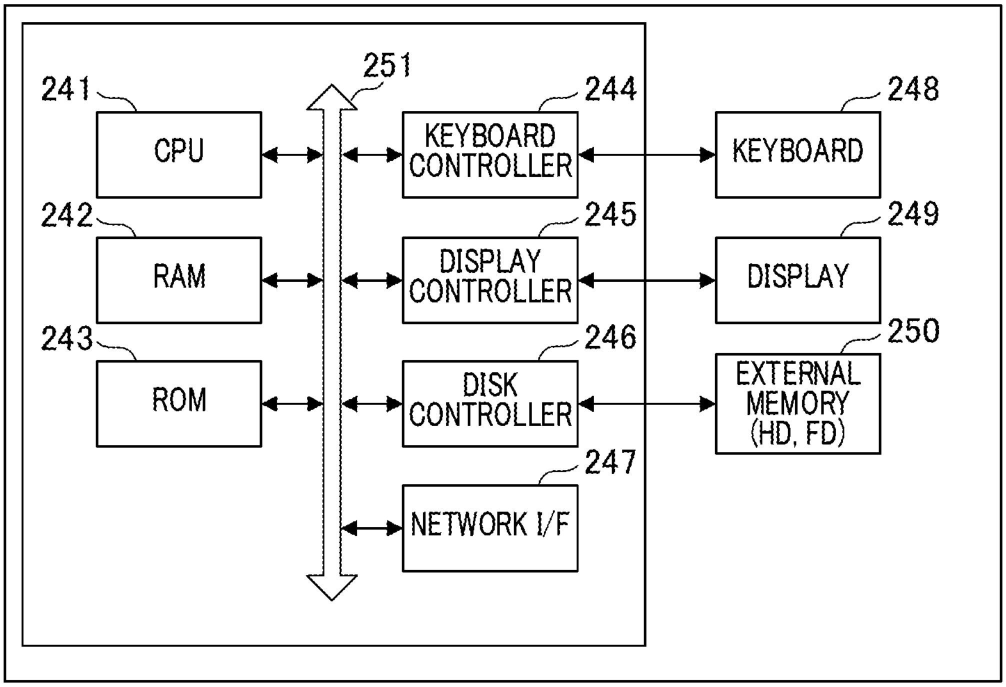

FIG. 2B is a diagram illustrating an example of a hardware configuration of the server 102.

The server 102 can be constituted of hardware of a general information processing apparatus. A CPU 241 executes a program stored in a ROM 243 and a program such as an OS (Operating System) and an application loaded from an external memory 250 to a RAM 242. That is to say, the CPU 241 functions as each processing unit to perform processing of each flowchart which will be described later by executing a program stored in a readable storage medium.

The RAM 242 is a main memory for the CPU 241 and functions as a work area or the like. A keyboard controller 244 controls an input operation from a keyboard 248 and a pointing device (not shown). The pointing device is, for example, a mouse, a touch pad, a touch panel, a trackball, and the like. A display controller 245 controls displaying of a display 249.

A disk controller 246 controls data access to the external memory 250, for example a hard disk (HD), a flexible disk (FD) and so on, which stores various types of pieces of data to. A network I/F 247 is connected to a network and performs communication control processing with other devices connected to the network. Furthermore, the network I/F 247 also accepts a communication method for proximity communication such as an NFC and Bluetooth, communicates with the mobile terminal 101 and the like, and exchanges data with the mobile terminal 101. The system bus 251 connects the processing units 241 to 250 to each other.

<Functional Configuration of Mobile Terminal>

Figure 3A:
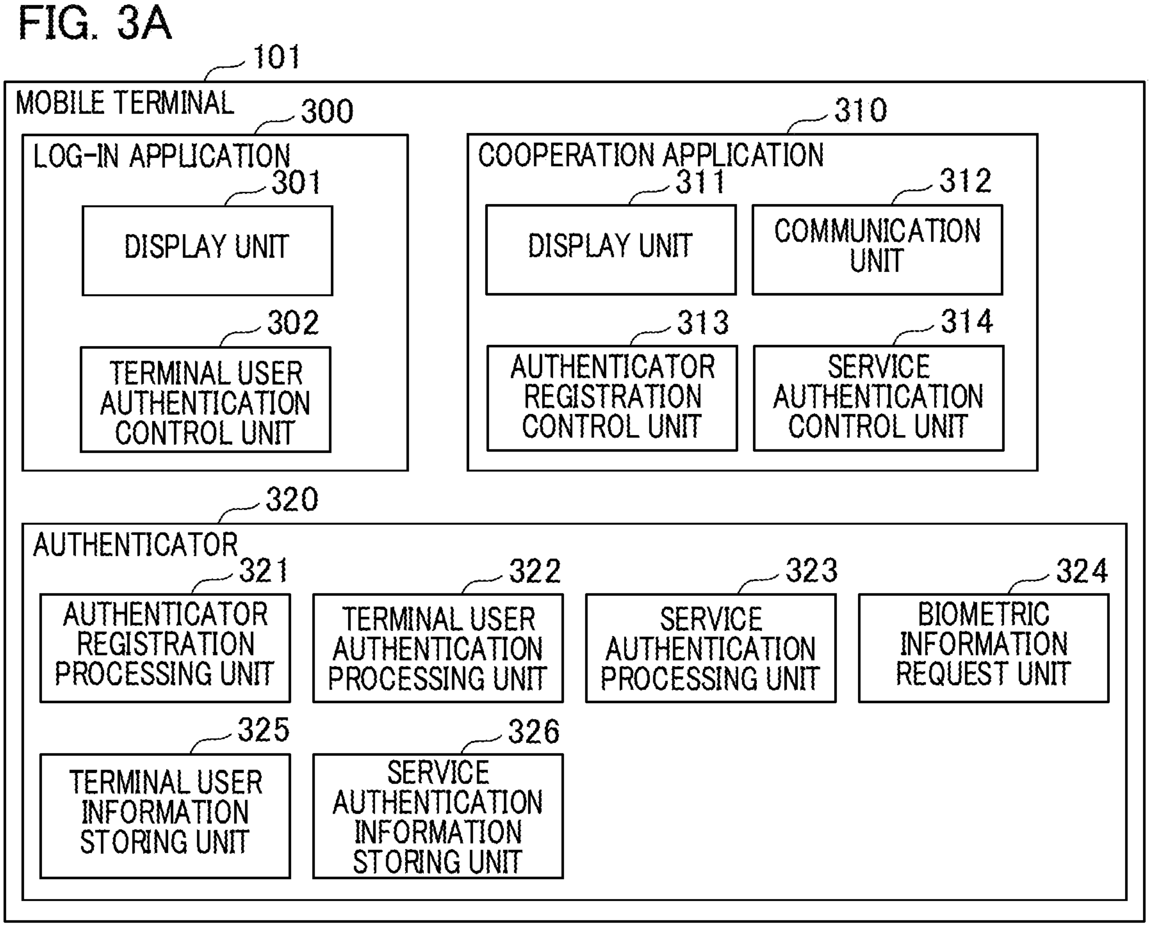
FIGS. 3A and 3B are diagrams illustrating an example of a functional configuration of each apparatus.

FIG. 3A is a diagram illustrating an example of a functional configuration of the mobile terminal 101.

The mobile terminal 101 includes a log-in application 300, a cooperation application 310, and an authenticator 320. The log-in application 300, the cooperation application 310, and the authenticator 320 are realized when the CPU 202 reads the program stored in the ROM 204 into the RAM 203 and executes the program.

The log-in application 300 performs the user's log-in processing to the mobile terminal 101. The details of the log-in processing will be described later. The log-in application 300 is constituted of a display unit 301 and a terminal user authentication control unit 302. The display unit 301 is a software module configured to provide a UI (User Interface) to the user via the touch panel 209. For example, the display unit 301 displays a screen configured to authenticate the user of the mobile terminal 101 and receives the user's operation, for example, via the touch panel 209.

The terminal user authentication control unit 302 is a software module configured to deliver an event associated to an authentication received through the display unit 301 to the authenticator 320 and to receive an authentication result from the authenticator 320. Note that, although the log-in application 300 is assumed to be loaded in the OS as a standard in the embodiment, the present invention is not limited thereto. For example, the log-in application 300 can be replaced by an application installed by the user if the application has the same function as the log-in application 300.

The cooperation application 310 provides an authentication function and a service of the server 102 to the user in cooperation with the server 102. The cooperation application 310 is a native application or a web browser installed in the mobile terminal 101. The cooperation application 310 is constituted of a display unit 311, a communication unit 312, an authenticator registration control unit 313, and a service authentication control unit 314.

The display unit 311 is a software module configured to provide a UI (User Interface) to the user via the touch panel 209. The display unit 311 displays a screen for registering the authenticator 320 in the server 102 and a screen for using a function provided by a service 370 in the server 102 which will be described later with reference to FIG. 3B. The communication unit 312 is a software module configured to communicate with an external apparatus such as the server 102 via the network I/F 207.

The authenticator registration control unit 313 is a software module configured to perform a credential creation request which will be described later to the authenticator 320. Note that, although the authenticator registration control unit 313 is included in the cooperation application 310 in the embodiment, the present invention is not limited thereto. For example, the authenticator registration control unit 313 may be configured independently from the cooperation application 310 and the cooperation application 310 may call an independent authenticator registration control unit 313.

Also, the authenticator registration control unit 313 may be loaded in the OS as a standard. In this way, when the authenticator registration control unit 313 is provided independently from the application, a configuration can be provided such that the cooperation application 310 as well as other applications can call the authenticator registration control unit 313.

The service authentication control unit 314 receives a request from the server 102 or the like to request biological authentication processing to the authenticator 320 and to generate requests transmitted to the server 102 at the time of authentication. Furthermore, the service authentication control unit 314 receives the result of the biological authentication processing. A specific processing flow performed by the service authentication control unit 314 will be described later. Note that the service authentication control unit 314 may be configured independently from the cooperation application 310 as in the authenticator registration control unit 313.

The authenticator 320 is an authentication module for a biometric authentication using biometric information read by the biometric information sensor 208. The authenticator 320 is constituted of an authenticator registration processing unit 321, a terminal user authentication processing unit 322, a service authentication processing unit 323, a biometric information request unit 324, a terminal user information storing unit 325, and a service authentication information storing unit 326.

The authenticator registration processing unit 321 is a software module configured to receive a credential creation request from the authenticator registration control unit 313 or the like in the cooperation application 310, to create a pair key (a private key and a public key) and a credential. The terminal user authentication processing unit 322 is a software module configured to receive an authentication request from the terminal user authentication control unit 302 in the log-in application 300 and to perform an authentication using information stored in the terminal user information storing unit 325.

The service authentication processing unit 323 is a software module configured to receive a biometric authentication request from the service authentication control unit 314 or the like in the cooperation application 310 and to perform a biometric authentication using biometric information read by the biometric information sensor 208. The biometric information request unit 324 is a software module configured to provide a UI for receiving an input of biometric information to the user using the touch panel 209.

The terminal user information storing unit 325 is a software module configured to store user information and the like of the mobile terminal 101 in the TPM 206. The user information stored in the terminal user information storing unit 325 is, for example, information listed in Table A which will be described later. The service authentication information storing unit 326 is a software module configured to store authentication information and the like in the TPM 206. The authentication information is, for example, information listed in Table B which will be described later. Note that, although the log-in application 300 and the authenticator 320 are configured as separate applications in the embodiment, the log-in application 300 and the authenticator 320 may be configured as a single application.

<Functional Configuration of Server>

Figure 3B:
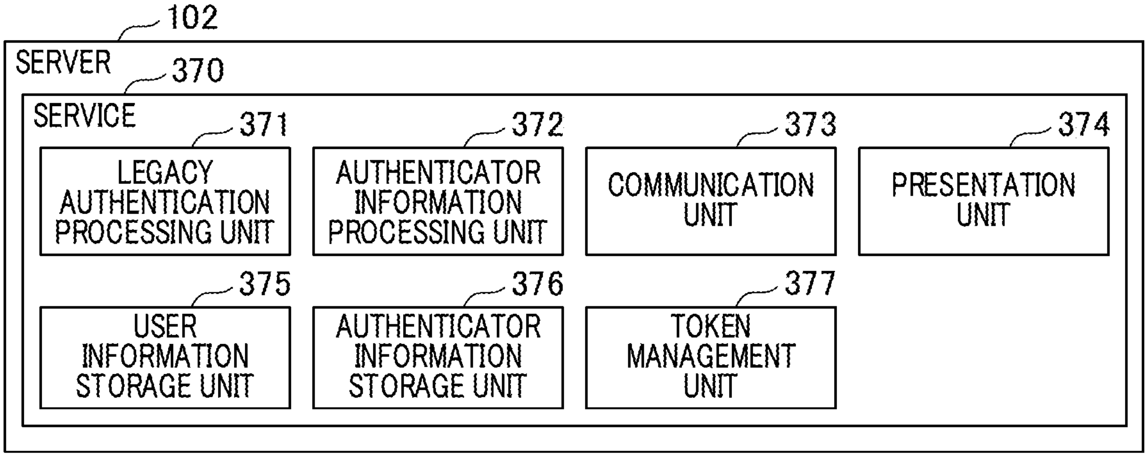

FIG. 3B is a diagram illustrating an example of a functional configuration of the server 102.

The service 370 operates in the server 102. The service 370 is realized when the CPU 241 reads a program stored in the ROM 243 included in the server 102 into the RAM 242 and executes the program.

The service 370 is constituted of a legacy authentication processing unit 371, an authenticator information processing unit 372, a communication unit 373, a presentation unit 374, a user information storage unit 375, an authenticator information storage unit 376, and a token management unit 377. It should be noted that an authentication in which coincidence verification of a user ID and a password is performed is referred to as a "legacy authentication" to distinguish this authentication from a biometric authentication in the embodiment.

The legacy authentication processing unit 371 is a software module configured to verify whether a user ID and a password included in a legacy authentication request received by the communication unit 373 coincide with a user ID and a password stored in the user information storage unit 375. The authenticator information processing unit 372 is a software module configured to store information related to the authenticator 320 in the authenticator information storage unit 376 using a credential received by the communication unit 373. Furthermore, the authenticator information processing unit 372 verifies assertion information which will be described later received by the communication unit 373.

The communication unit 373 is a software module configured to communicate with an external apparatus such as the mobile terminal 101 via the network I/F 247. For example, the communication unit 373 receives various requests from the mobile terminal 101. The presentation unit 374 is a software module configured to generate screens, for example a screen for registering the authenticator 320 received by the communication unit 373, by using hypertext markup language (HTML), a cascading style sheet (CSS), JavaScript (registered trademark) or other type of web programming language in response to an acquisition request of various screens.

The user information storage unit 375 is a software module configured to store information related to the user (hereinafter called 'user information'), which will be described later using Tables C and F, in the external memory 250 or an external storage system (not shown). The authenticator information storage unit 376 is a software module configured to store information related to the authenticator 320 (hereinafter called 'authenticator information'), which will be described later using Table E, in the external memory 250 or an external storage service. The token management unit 377 is a software module configured to issue and verify a token which will be described later.

<Table Managed by Mobile Terminal>

Various types of pieces of data stored in the TPM 206 by the mobile terminal 101 will be described below using Tables A and B. To be specific, table data illustrated in Tables A and B is data stored in the TPM 206 by the terminal user information storing unit 325 and the service authentication information storing unit 326 in the authenticator 320 included in the mobile terminal 101.

TABLE A

Terminal user information table

| User ID | Password | Biometric information ID | Log-in state | Authentication method |
|---|---|---|---|---|
| local_user_A | ************ | d493a744 | log-in | fingerprint |
| local_user_B | ************ | dcc97daa | logoff | |
| . . . | . . . | . . . | . . . | . . . |

A terminal user information table in Table A is an example of a terminal user information table managed by the mobile terminal 101. The terminal user information storing unit 325 stores and manages the terminal user information table in the TPM 206. In the terminal user information table, one record indicates an entry of a piece of information of one terminal user. A user ID column stores an ID in which the mobile terminal 101 can uniquely identify the user used for a legacy authentication or the like.

A password column stores a password for authenticating the user for the user to log-in to the mobile terminal 101. A biometric information ID column stores an ID corresponding to a feature quantity of biometric information. The mobile terminal 101 permits logging-in to the mobile terminal 101 when a password input by the user or a biometric information ID corresponding to biometric information coincides with that in the table. The user ID, the password, and the biometric information ID are set when the user is registered in the mobile terminal 101. The details of a process of logging into the mobile terminal 101 will be described later using FIG. 4.

A log-in state column stores information indicating whether the user is currently logged in. An authentication method column stores information indicating an authentication method in which the user has logged in. For example, when the user has logged in through a fingerprint authentication which is one of biometric authentications, an authentication method column stores, for example, "fingerprint" as information indicating that the authentication method is the fingerprint authentication. A procedure for storing pieces of information corresponding to the log-in state column and the authentication method column will be described below using FIG. 4.

TABLE B

Service authentication information management table

| Authentication information ID | Service ID | Private key | Biometric information ID |
|---|---|---|---|
| 407c-8841-79d | service.com | 1faea2da-a269-4fa7-812a-509470d9a0cb | d493a744 |
| 4c04-428b-a7a2 | service.com | d7ae30c8-3775-4706-8597-aaf681bc30f5 | dcc97daa |
| 92b2-498d-bea6 | print.com | 36ae5eed-732b-4b05-aa76-4dddb4be3267 | 51caacaa |
| . . . | . . . | . . . | . . . |

In a service authentication information management table in Table B, one record indicates an entry of one piece of authentication information. The record in Table A is created when the authenticator 320 is registered in a service and is added to Table B. An authentication information ID column stores an ID for uniquely identifying each piece of authentication information. A service ID column stores an ID for uniquely identifying a service which uses an authentication function using biometric information.

In the embodiment, a domain name of the server and the service, specifically, information on a top level domain and a secondary level domain are used as a service ID. For example, when a uniform resource locator (URL) of the service 370 is http://www.service.com, the service ID of the service 370 is set to service.com.

A private key column stores a private key in a pair key created for biometric information. A corresponding public key (that is, a public key paired with the private key) in the private key column is registered in a service indicated in the service ID column. A biometric information ID column stores an ID corresponding to a feature quantity of the biometric information. A procedure for storing information corresponding to each column in the service authentication information management table and a procedure for storing the public key in the service 370 will be described later.

<Table Managed by Server>

Various types of pieces of data stored by the server 102 will be described using Tables C to F. To be specific, table data listed in Tables C to F is data stored in the external memory 250 or an external storage system by each software module of the service 370 included in the server 102.

TABLE C

User information management table

| User ID | Password | Mail address |
|---|---|---|
| user001 | ************ | user001@co.jp |
| user004 | ************ | user004@co.jp |
| . . . | . . . | . . . |

A user information management table in Table C is data managed by the user information storage unit 375 in the service 370. In the user information management table, one record indicates an entry of one piece of user information of the service 370. A user ID column stores an ID for uniquely identifying the user of the service 370. A password column stores a password for authenticating the user. A mail address column stores a mail address of the user. It should be noted that the user information management table may store attribute information associated with the user such as the user's address in addition to a mail address as user information.

TABLE D

Attestation challenge management table

| Attestation challenge | User ID | Effective period |
|---|---|---|
| 65C9B063-9C33 | user001 | 2017-05-02T12:00:34Z |
| 7317EFBA-4E63 | user101 | 2017-05-02T12:03:12Z |
| . . . | . . . | . . . |

An attestation challenge management table in Table D is data managed by the user information storage unit 375 in the service 370. In the attestation challenge management table, one record indicates an entry of one piece of attestation challenge information. A attestation challenge is a parameter used as verifying data for performing a challenge response authentication and issued for each user.

A process of issuing an attestation challenge will be described later. An attestation challenge column stores a value of the attestation challenge. An user ID column stores a user ID of a user who has issued an attestation challenge. An effective period column stores an effective period of the attestation challenge.

TABLE E

Authenticator information management table

| Authentication information ID | Public key | User ID |
|---|---|---|
| 407c-8841-79d | AC43C5FB-BFA2-48D1-A71B-FB04ACDA347A | user001 |
| 4c04-428b-a7a2 | 8143CA9F-35C9-4333-948F-BFCE66A74310 | user002 |
| . . . | . . . | . . . |

An authenticator information management table in Table E is data managed by the authenticator information storage unit 376 in the service 370. In the authenticator information management table, one record indicates one piece of authenticator information. A record is added to the authenticator information management table when registering the authenticator 320. An authentication information ID column stores a value of an authentication information ID column of the authentication information in which the registered authenticator 320 is managed by using the service authentication information management table (i.e. Table B).

A public key column stores a public key corresponding to a private key (that is, a public key paired with the private key) created by the authenticator 320 and managed through the service authentication information management table (i.e. Table B). That is to say, if a private key and a public key have the same value of authentication information ID in the service authentication information management table (i.e. Table B) and the authenticator information management table (i.e. Table E), data encrypted with a private key in Table B can be decrypted with a public key in Table E. A user ID column stores an ID used when the service 370 uniquely identifies the user.

TABLE F

Token management table

| Token | User ID | Effective period |
|---|---|---|
| 3FD4FA-AA4-56DC-B45F-45BCD65AC45D | user001 | 2017-05-02T13:14:31Z |
| EC51DC-36C4-4BC3-54CF-31ECE6CACBF0 | user003 | 2017-05-02T13:31:32Z |
| . . . | . . . | . . . |

A token management table in Table F is data managed by the user information storage unit 375 in the service 370. In the embodiment, a token is issued by the service 370 as a result of a success of a series of authentication processes using biometric information which will be described later. The cooperation application 310 can use a function provided by the service 370 by providing the issued token and transmitting a request at the time of using the service 370.

In the token management table, one record indicates one piece of token information. A token column stores a token. A user ID column stores an ID in which the service 370 uniquely identifies the user. An effective period column stores an effective period for the token. When there is a token provided to a request from the user in the token column in the token management table and a period thereof does not exceed an effective period in the effective period column, the service 370 receives the request.

<Log-in Processing into Mobile Terminal>

Log-in processing into the mobile terminal 101 will be described below with reference to FIGS. 4 and 5A.

Figure 4:
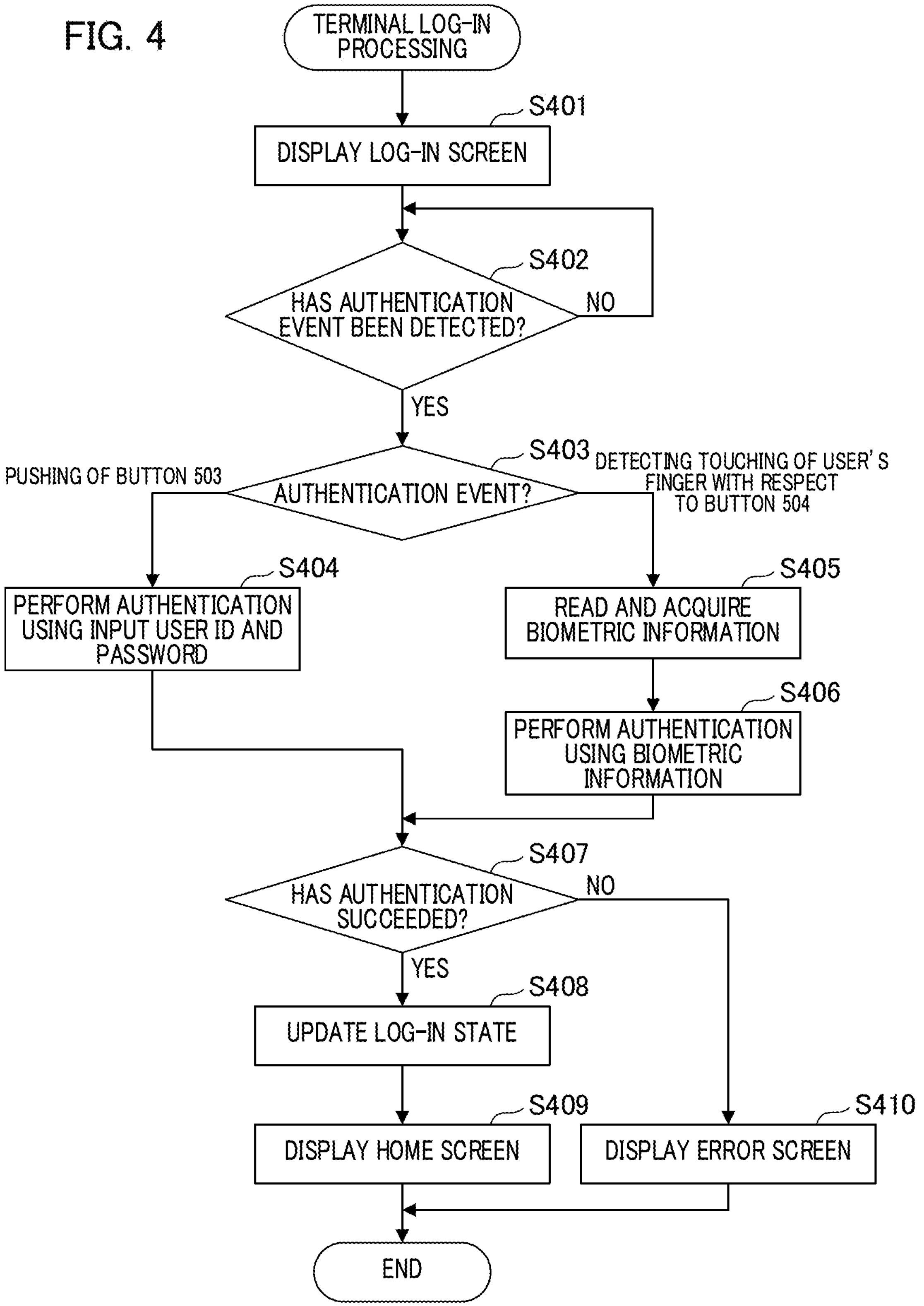
FIG. 4 is a flowchart showing a process of logging into a mobile terminal.

FIG. 4 is a flowchart for describing the log-in processing into the mobile terminal 101.

First, in Step S401, the display unit 301 in the log-in application 300 displays a log-in screen.

Figure 5A:
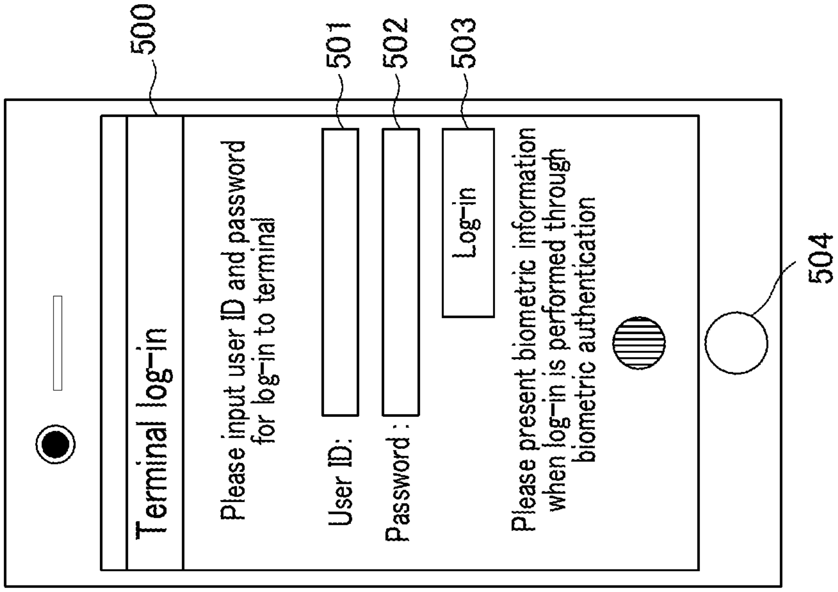
FIGS. 5A to 5D are diagrams illustrating an example of a user interface (UI) displayed by a mobile terminal in a first embodiment.

FIG. 5A is an example of the log-in screen displayed in Step S401.

A log-in screen 500 is a UI displayed in the display unit 301 in the log-in application 300. A text box 501 is a text box configured to allow an input of a user ID of the mobile terminal 101. A text box 502 is a text box configured to allow an input of a password. A button 503 is a button configured to receive a log-in request using the user ID and the password input to the text boxes 501 and 502.

A button 504 is a button configured to read biometric information such as a fingerprint and includes the biometric information sensor 208. It should be noted that information such as veins, irises, voices, and faces can be used as biometric information and the present invention is not limited thereto. Here, the mobile terminal 101 is configured to input any biometric information or any combination of a plurality of pieces of biometric information as biometric information used for a biometric authentication.

Also, the button 504 is a button configured to read biometric information such as a fingerprint and to receive a log-in request using the biometric information. In this way, in the embodiment, the mobile terminal 101 can perform logging-in using the user ID and the password and logging-in using the biometric information. It should be noted that a method of logging into the mobile terminal 101 is not limited to, and for example, there may a configuration in which a log-in request is received using other methods such as logging-in using a PIN code.

Description will be provided by referring again to FIG. 4. In Step S402, the display unit 301 determines whether an authentication event has been detected. In the embodiment, the authentication event occurs when the pushing of the button 503 has been detected or when the button 504 has detected the user's finger in the log-in screen 500. When it is determined that the authentication event has been detected, the process proceeds to a process of Step S403 and when it is determined that the authentication event has not been detected, monitoring of the authentication event is continued.

In Step S403, the display unit 301 determines whether the authentication event is due to the detection of the pushing of the button 503 or the detection of the user's finger by the button 504. When it is determined that the authentication event is due to the detection of the pushing of the button 503, the display unit 301 delivers the user ID and the password input to the log-in screen 500 to the terminal user authentication processing unit 322 in the authenticator 320 via the terminal user authentication control unit 302. Then, the process proceeds to a process of Step S404.

On the other hand, when it is determined that the authentication event is due to the detection of the user's finger by the button 504, the display unit 301 requests a biometric authentication to the terminal user authentication processing unit 322 in the authenticator 320 via the terminal user authentication control unit 302. Then, the process proceeds to a process of Step S405.

In Step S404, the terminal user authentication processing unit 322 in the authenticator 320 performs a legacy authentication using the user ID and the password delivered in Step S403. To be specific, the terminal user authentication processing unit 322 performs the authentication for the user by verifying whether a combination of the user ID and the password delivered in Step S403 is stored in the terminal user information table (i.e. Table A) managed by the terminal user information storing unit 325.

In Step S405, the display unit 301 reads biometric information via the biometric information sensor 208 included in the button 504. Moreover, the display unit 301 delivers the read biometric information to the terminal user authentication processing unit 322 in the authenticator 320 via the terminal user authentication control unit 302.

In Step S406, the terminal user authentication processing unit 322 in the authenticator 320 performs a biometric authentication using the biometric information delivered in Step S405. To be specific, the terminal user authentication processing unit 322 performs the authentication for the user by identifying a biometric information ID corresponding to a feature quantity of the biometric information delivered in Step S405 from among the terminal user information table (i.e. Table A) managed by the terminal user information storing unit 325.

In Step S407, the terminal user authentication processing unit 322 determines whether the authentication of Step S404 or Step S406 has succeeded. When it is determined that the authentication has succeeded, the process proceeds to a process of Step S408. On the other hand, when it is determined that the authentication has failed, information indicating the failure of the authentication is delivered to the terminal user authentication control unit 302 in the log-in application 300, and then, the process proceeds to a process of Step S410.

In Step S408, the terminal user authentication processing unit 322 updates a log-in state column and an authentication method column in the terminal user information table (i.e. Table A) via the terminal user information storing unit 325. For example, when it is determined that the authentication event has occurred due to the detection of the user's finger by the button 504, the log-in state column is updated to "logged-in" indicating that the logging-in has been completed and the authentication method column is updated to "fingerprint" indicating that the fingerprint authentication has been performed.

In Step S409, the OS of the mobile terminal 101 displays a home screen (not shown) and the process illustrated in FIG. 4 ends. The home screen has a button or the like configured to call the cooperation application 310 or other applications disposed thereon. In S410, the display unit 301 in the log-in application 300 displays a UI (not shown) indicating that it is determined that the logging-in has failed and the process illustrated in FIG. 4 ends.

<Registration Processing of Authenticator>

A process of registering the authenticator 320 of the mobile terminal 101 in the service 370 of the server 102 will be described below with reference to FIGS. 5B to 8.

Registering information on an authenticator in a service is simply referred to as "authenticator registration."

Figure 5B:
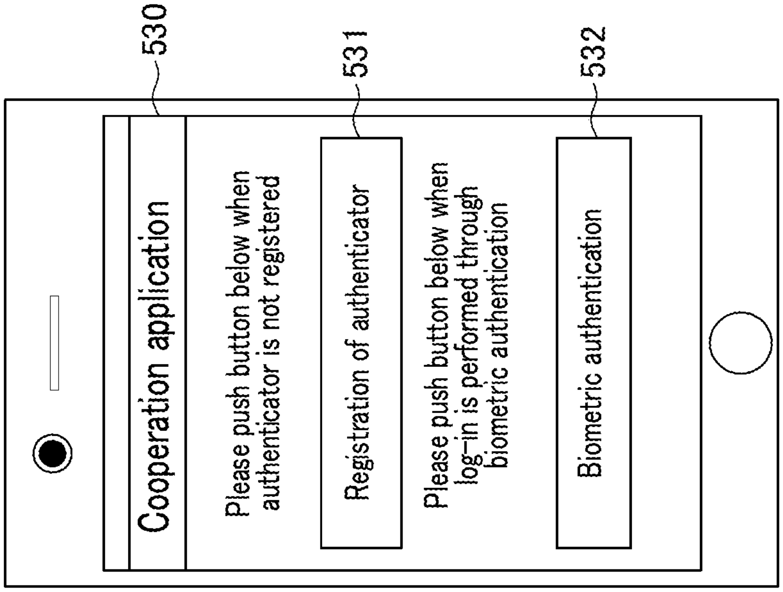

FIG. 5B is a diagram illustrating an example of a top screen for the cooperation application 310 in the mobile terminal 101.

A top screen 530 in the cooperation application 310 is a UI displayed on the display unit 311 of the cooperation application 310. In the home screen (not shown) displayed in Step S409 in FIG. 4, the display unit 301 displays the top screen 530 when the pushing of a button configured to call the cooperation application 310 is detected.

The top screen 530 is constituted of a button 531 and a button 532. The button 531 is a button for registering the authenticator 320 in the service 370 of the server 102. When the button 531 is pushed, a registration request to the service 370 is received. The button 532 is a button for receiving a biometric authentication request to the service 370 in the server 102. The biological authentication processing in the service 370 will be described with reference to FIG. 9. The display unit 311 in the cooperation application 310 displays a legacy authentication screen illustrated in FIG. 5C when the pushing of the button 531 is detected.

Figure 5C:
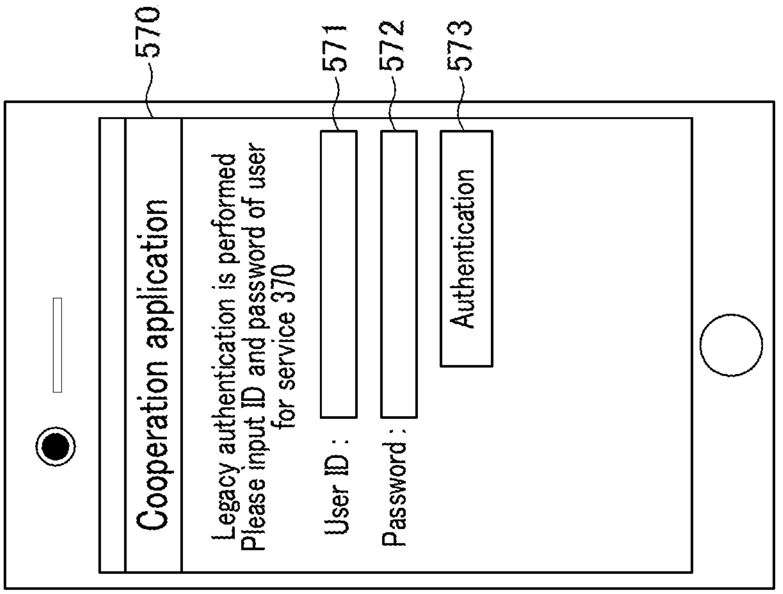

FIG. 5C is a diagram illustrating an example of the legacy authentication screen.

A legacy authentication screen 570 is a UI displayed by the cooperation application 310 of the display unit 311. The legacy authentication screen 570 is constituted of text boxes 571 and 572 and a button 573. The text box 571 is a text box for inputting a user ID in the service 370 of the server 102.

The text box 572 is a text box for inputting a password. The button 573 is a button for receiving a legacy authentication request using the user ID and the password input to the text boxes 571 and 572. When the display unit 311 in the cooperation application 310 detects the pushing of the button 573, the process illustrated in FIG. 6 starts.

Figure 6:
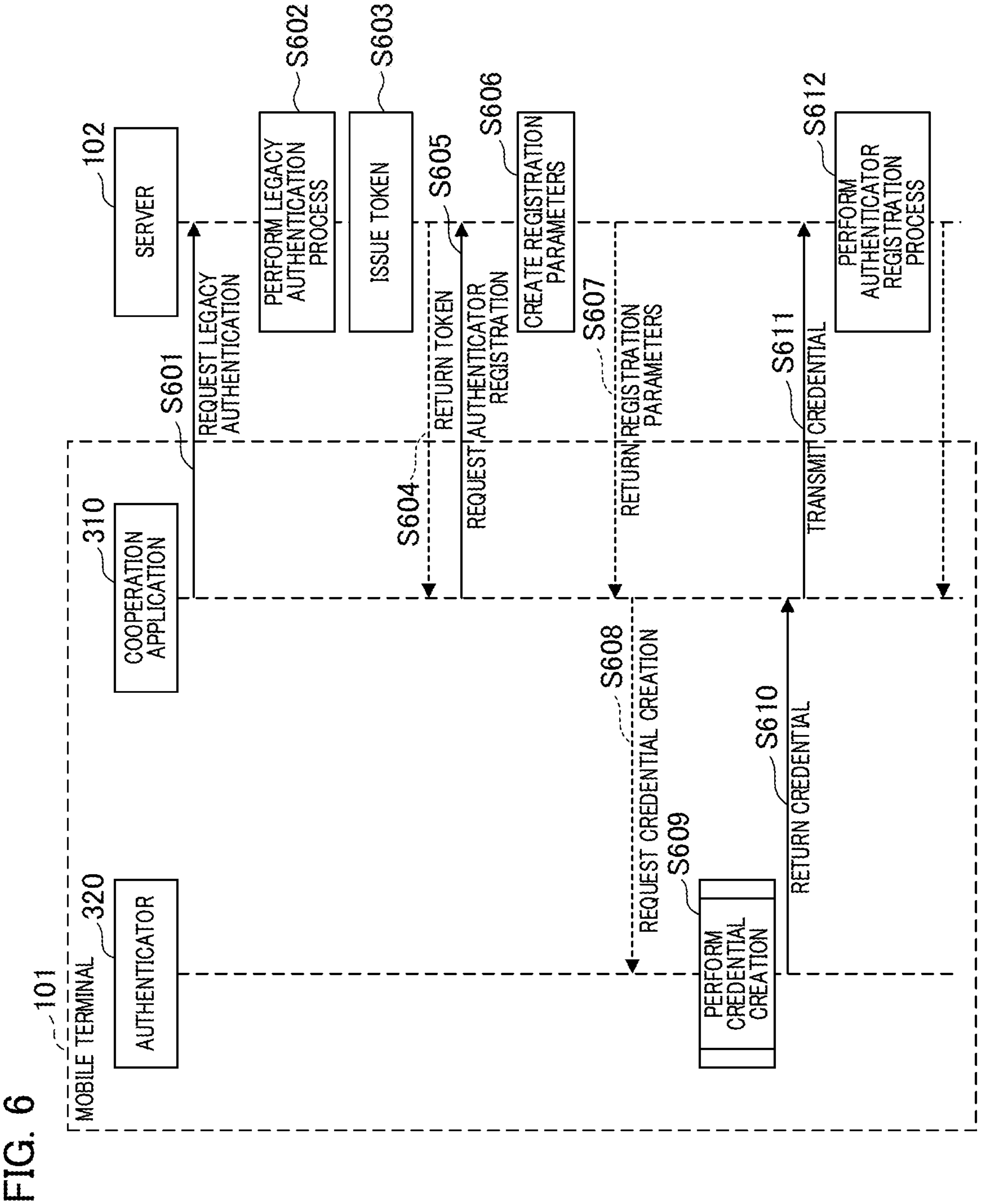
FIG. 6 is a diagram showing a sequence of a process of registering an authenticator in a service.

FIG. 6 is a diagram illustrating a sequence of a process of registering the authenticator 320 of the mobile terminal 101 in the service 370 of the server 102.

In Step S601, the communication unit 312 in the cooperation application 310 transmits a legacy authentication request to the service 370 in the server 102 using the user ID and the password input to the legacy authentication screen 570 as parameters.

In Step S602, the legacy authentication processing unit 371 in the service 370 verifies the received ID and password. When the result of the legacy authentication is an error, the legacy authentication processing unit 371 returns an authentication error to the cooperation application 310. FIG. 6 shows a case the legacy authentication has succeeded.

In Step S603, the token management unit 377 in the service 370 issues a token and the user information storage unit 375 manages information on the token using the token management table (i.e. Table F). In Step S604, the communication unit 373 in the service 370 returns the token issued in Step S603 to the cooperation application 310.

In Step S605, the communication unit 312 in the cooperation application 310 transmits an authenticator registration request to the service 370. The authenticator registration request includes the token received in Step S604. In subsequent processing, a request from the cooperation application 310 to the service 370 similarly includes a token.

In Step S606, the authenticator information processing unit 372 in the service 370 creates registration parameters 700. In a process of Step S606, the token management unit 377 verifies the validity for a token included in a request in Step S605 and the process is performed when the token is verified to be valid. The validity for the token is determined to be valid when the token included in the request in Step S605 exits in the token management table (i.e. Table F) and a period thereof does not exceed an effective period.

Registration parameters are data used when the server 102 performs the registration processing for the authenticator 320. The authenticator 320 receives the registration parameters via the cooperation application 310 and creates a credential using data included in the registration parameters. Then, the server 102 receives the credential via the cooperation application 310 and verifies that a registration request from the cooperation application 310 is not an unauthorized request on the basis of the credential. The registration parameters will be described below.

Figure 7A:
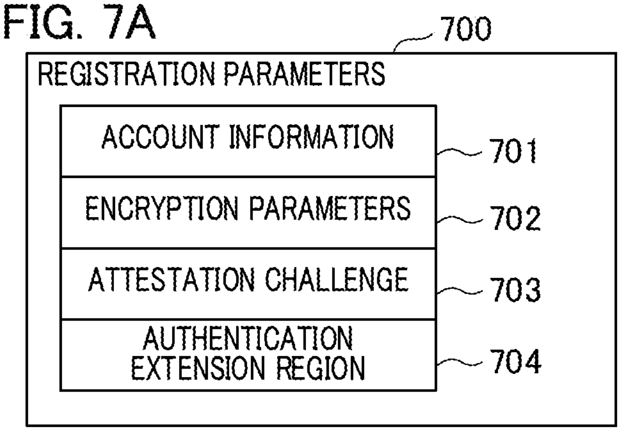
FIGS. 7A to 7C are diagrams illustrating an example of parameters used at the time of registering an authenticator.
Figure 7B:
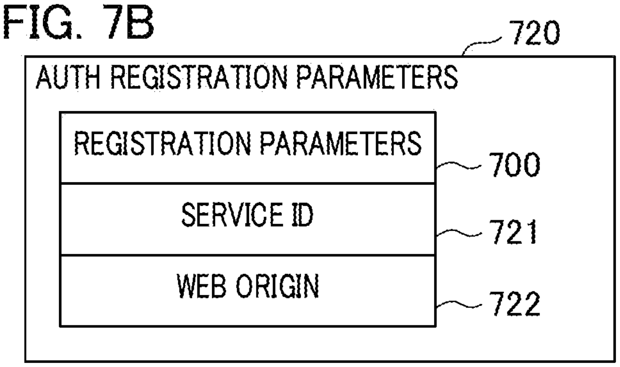
Figure 7C:
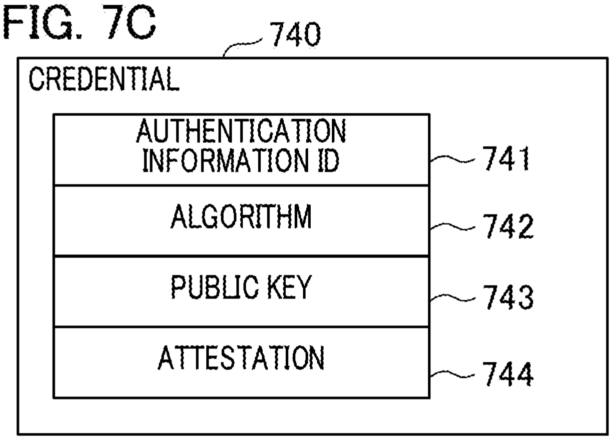

FIGS. 7A to 7C are diagrams illustrating an example of parameters included in communication between the mobile terminal 101 and the server 102 at the time of registering the authenticator 320.

Here, the registration parameters will be described with reference to FIG. 7A. The registration parameters 700 are constituted of account information 701, an encryption parameter 702, attestation challenge 703, and an authentication extension region 704.

The account information 701 stores attribute information associated with the user in the service 370 such as the user ID identified through the legacy authentication in Step S602 and a mail address linked with the user ID. The encryption parameter 702 stores attribute information associated with authentication information to be registered such as an encryption algorithm supported by the service 370. The attestation challenge 703 stores verifying data used to perform the challenge response authentication.

The verifying data, that is, the attestation challenge 703, is created when the registration parameters are created in Step S606, and is stored in the attestation challenge management table (i.e. Table D) with being associated with a user ID, an effective period, or the like. The authentication extension region 704 stores an extension parameter which is used for the service 370 to control an operation of the cooperation application 310, the authenticator 320, and the like and can be designated by the service 370.

Description will be provided by referring again to FIG. 6. In Step S607, the communication unit 373 in the service 370 transmits a credential creation request to the cooperation application 310. The request includes the registration parameters 700 created in Step S606. In Step S608, the authenticator registration control unit 313 in the cooperation application 310 transmits the credential creation request to the authenticator 320. The credential creation request includes Auth registration parameters. The Auth registration parameters will be described below.

FIG. 7B is a diagram illustrating an example of the Auth registration parameters.

Auth registration parameters 720 are constituted of the registration parameters 700, a service ID 721, and a Web Origin 722. The registration parameters 700 are the same as the registration parameters 700 received from the service 370 in Step S607.

The service ID 721 is an ID for uniquely identifying the service 370 to be registered of the authenticator 320 described with reference to Table B and the like. The Web Origin 722 is a combination of a protocol, a host name and a port, and stores the Origin of the service 370 in the embodiment.

Description will be provided by referring again to FIG. 6. In Step S609, the authenticator 320 performs the credential creation process. The credential creation process in the authenticator 320 will be described below.

Figure 8:
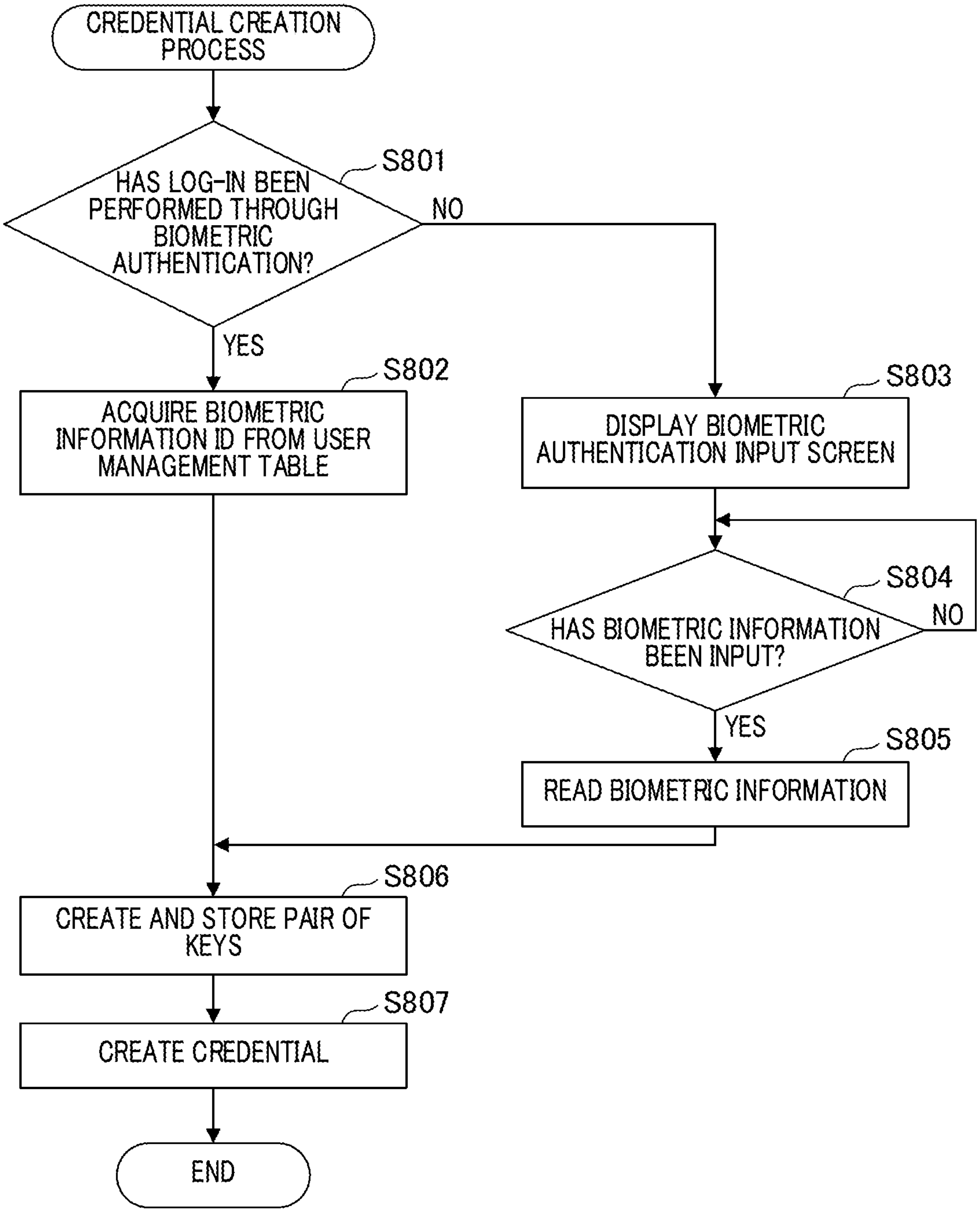
FIG. 8 is a flowchart showing a credential creation process according to the first embodiment.

FIG. 8 is a flowchart for describing the credential creation process performed by the authenticator 320.

In Step S801, the authenticator registration processing unit 321 determines whether the user has logged into the mobile terminal 101 using a biometric authentication via the terminal user authentication processing unit 322. To be specific, the terminal user authentication processing unit 322 confirms that the currently logged-in user has logged-in using the biometric authentication by referring to the terminal user information table A via the terminal user information storing unit 325.

For example, when a value of the log-in state column in the terminal user information table (i.e. Table A) is "logged-in" and a value of the authentication method column is "fingerprint" indicating the fingerprint authentication which is one of the biometric authentications, it is determined that the user has logged-in using the biometric authentication. When it is determined that the user has logged-in using the biometric authentication, the process proceeds to a process of Step S802. When it is determined that the user has not logged-in using the biometric authentication, the process proceeds to a process of Step S803.

In Step S802, the authenticator registration processing unit 321 acquires a biometric information ID of the user who has logged-in using a biometric authentication from the terminal user information table (i.e. Table A) via the terminal user authentication processing unit 322. In Step S803, the biometric information request unit 324 displays a consent screen for prompting the user to input (or present) the biometric information.

Figure 5D:
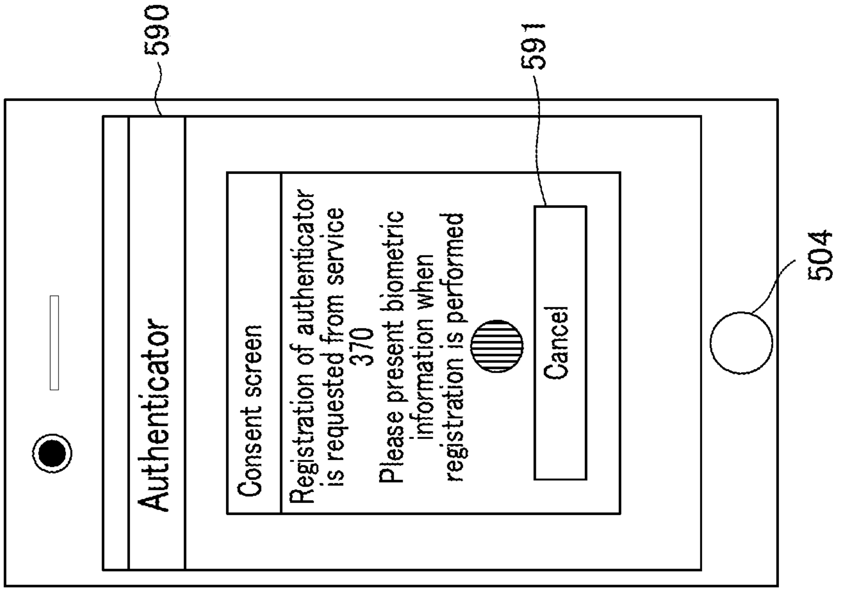

FIG. 5D is a diagram illustrating an example of a consent screen.

A consent screen 590 is a UI displayed by the biometric information request unit 324 in the authenticator 320. In the consent screen 590, the user is prompted to input (or present) biometric information required for registering the authenticator 320 in the service 370. A button 591 is a button in which the user cancels processing without agreeing to the input of biometric information. As described above, the button 504 is a button configured to read biometric information such as a fingerprint and includes the biometric information sensor 208.

Description will be provided by referring again to FIG. 8. In Step S804, the biometric information request unit 324 monitors an input of biometric information until the button 504 detects the input of the biometric information. When the biometric information has been input, the process proceeds to a process of Step S805. In Step S805, the biometric information request unit 324 creates a feature quantity for the biometric information read by the biometric information sensor 208 included in the button 504 and a biometric information ID for uniquely identifying the biometric information.

In Step S806, the authenticator registration processing unit 321 creates a pair of a private key and a public key. Moreover, the authenticator registration processing unit 321 stores the following information in the service authentication information management table (i.e. Table B) stored in the TPM 206 by using the service authentication information storing unit 326.

The biometric information ID acquired in Step S802 or created in Step S805, a private key of the pair of keys created in Step S806, and the service ID 721 of the Auth registration parameters 720 included in the credential creation request are associated with each other and are stored as authentication information. Furthermore, an ID for uniquely identifying each authentication information is created for each stored authentication information and is stored in the service authentication information management table (i.e. Table B) as an authentication information ID. In Step S807, the authenticator registration processing unit 321 creates a credential and the process illustrated in FIG. 8 ends. The credential will be described below.

FIG. 7C is a diagram illustrating an example of the credential.

A credential 740 is constituted of an authentication information ID 741, an algorithm 742, a public key 743, and an attestation 744. The authentication information ID 741 is the same as the authentication information ID stored in the service authentication information management table (i.e. Table B) in Step S806 and the public key 743 is the same as the public key of the pair of keys created in Step S806.

As the algorithm 742, an algorithm used when the pair of keys are created in Step S806 is stored. Furthermore, the attestation 744 is data created by encrypting the attestation challenge 703 in the Auth registration parameters 720 included in the credential creation request using the private key created in Step S806.

Description will be provided by referring again to FIG. 6. In Step S610, the authenticator registration processing unit 321 returns the credential 740 created in Step S807 to the cooperation application 310. In Step S611, the communication unit 312 in the cooperation application 310 transmits the credential 740 received in Step S610 to the service 370. In Step S612, the authenticator information processing unit 372 in the service 370 performs authenticator registration processing using the received credential 740. The registration processing for the credential performed by the authenticator information processing unit 372 will be described below.

The authenticator information processing unit 372 decrypts the attestation 744 included in the credential 740 using the public key 743 included in the same credential 740 and verifies that the request is not an unauthorized registration request. In addition, the authenticator information processing unit 372 identifies a record having a value that is the same as a value obtained by decrypting the attestation 744 using the public key 743 from the attestation challenge column in the attestation challenge management table (i.e. Table D).

Also, the authenticator information processing unit 372 recognizes a user ID of the identified record as a user ID associated with the credential 740. Moreover, the authenticator information processing unit 372 stores (or registers) the authentication information ID 741 included in the credential 740, the public key 743, and the user ID associated with the credential 740 in the authenticator information management table (i.e. Table E). Finally, the communication unit 373 in the service 370 notifies the cooperation application 310 that the registration processing of the authenticator 320 has been completed normally.

In this way, when the user logs into the mobile terminal 101 using the biometric authentication and make the mobile terminal 101 perform the registration processing of the authenticator 320, the processes of Step S801 and S802 are executed and so the user does not need to present biometric information in the registration processing.

In a service provision system using FIDO, for example, it is necessary to perform authenticator registration for each service desired by the user to use and it is required to present biometric information each time an authenticator registration is performed.

In contrast, according to the embodiment, when the user logs into the mobile terminal 101 using the biometric authentication, the authenticator registration is performed using the biometric information presented at the time of logging-in. Thus, the user need no longer be asked to present biometric information. For this reason, the usability of the user is improved.

<Service Authentication Processing>

The authentication processing by the service 370 after an authenticator is registered will be described below with reference to FIGS. 9 to 10C.

A case in which the service 370 authenticates the user when the user logs into the cooperation application 310 in the mobile terminal 101 to use the service 370 will be described below. When the display unit 311 in the cooperation application 310 detects pushing of the button 532 of the top screen 530 in the cooperation application 310, the process illustrated in FIG. 9 starts.

Figure 9:
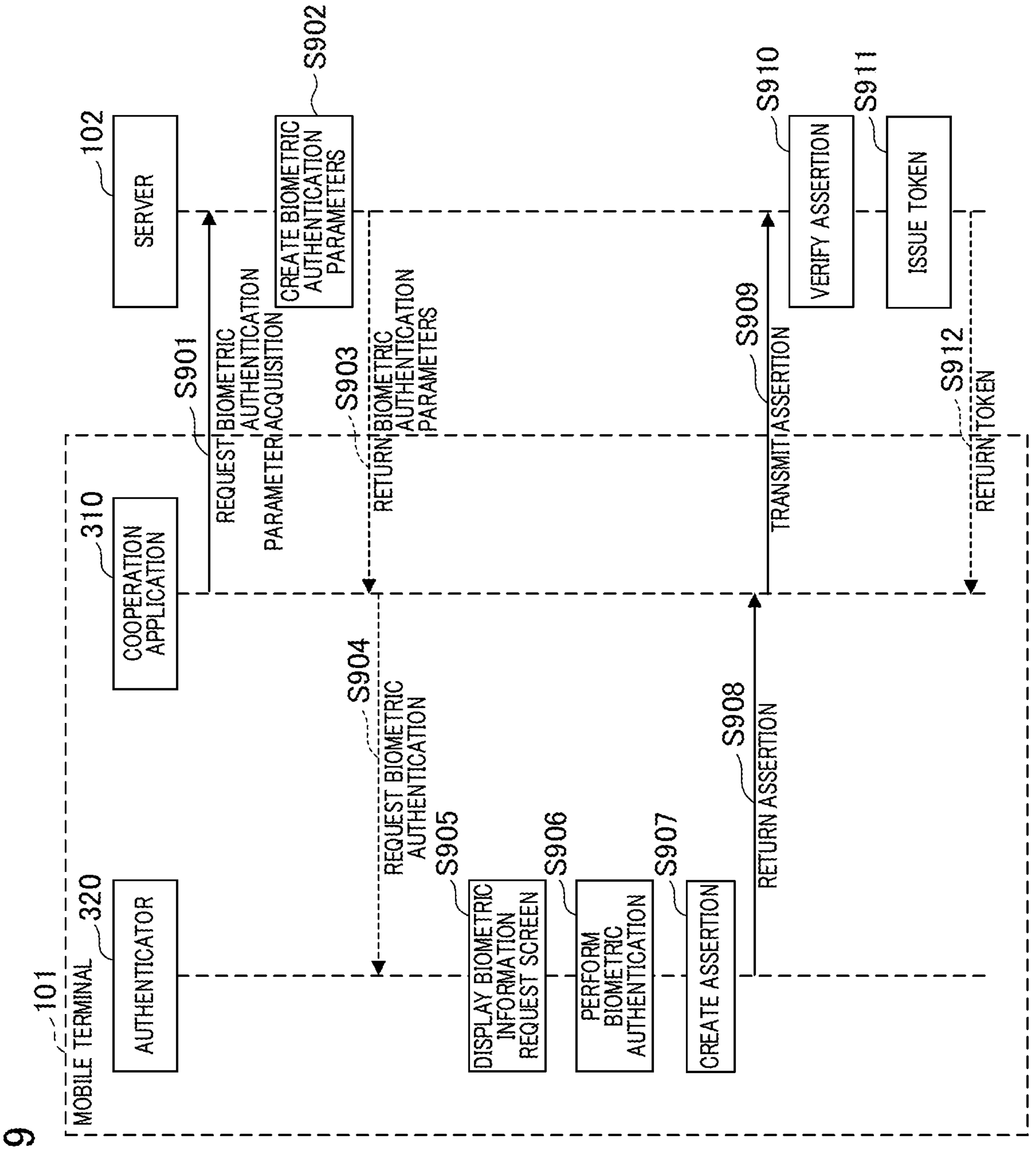
FIG. 9 is a diagram showing a sequence of authentication processing at the time of using a service.

FIG. 9 is a diagram for describing a sequence of authentication processing at the time of using a service 370 of the server 102.

In Step S901, the communication unit 312 in the cooperation application 310 sends an acquisition request for biometric authentication parameters to the service 370 in the server 102.

In Step S902, the authenticator information processing unit 372 in the service 370 creates the biometric authentication parameters. The biometric authentication parameters are data used when the service 370 authenticates the user for the cooperation application 310. The biometric authentication parameters will be described below.

Figure 10A:
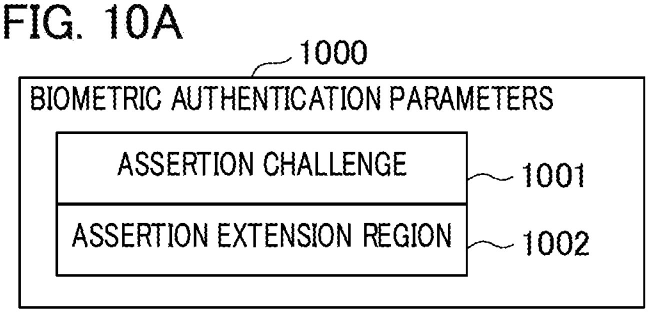
FIGS. 10A to 10C are diagrams illustrating an example of parameters used at the time of biometric authentication.
Figure 10B:
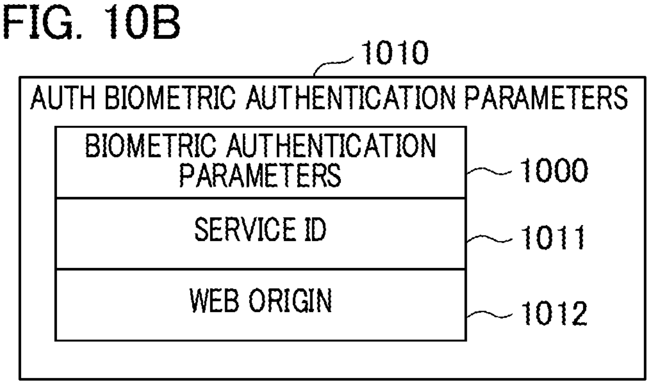
Figure 10C:
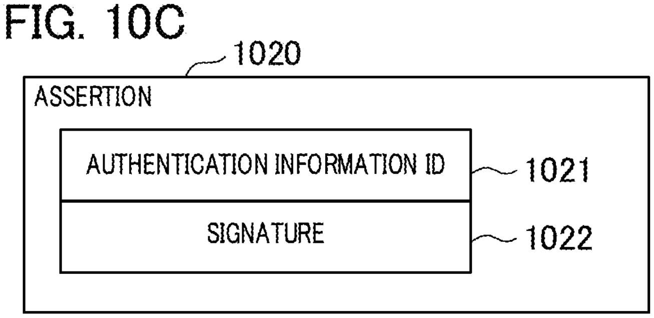

FIGS. 10A to 10C are diagrams illustrating an example of parameters included in communication between the mobile terminal 101 and the server 102 in authentication processing using biometric information.

Here, the biometric authentication parameters will be described with reference to FIG. 10A. Biometric authentication parameters 1000 are constituted of an Assertion challenge 1001 and an Assertion extension region 1002.

The Assertion challenge 1001 stores verifying data used for performing a challenge response authentication. The Assertion extension region 1002 stores extension parameters which is used for the service 370 to control an operation of the cooperation application 310, the authenticator 320, and the like, and can be designated by the service 370.

Description will be provided by referring again to FIG. 9. In Step S903, the communication unit 373 in the service 370 returns the biometric authentication parameters 1000 created by the authenticator information processing unit 372 in Step S902 to the cooperation application 310 and requests a biometric authentication. In Step S904, the service authentication control unit 314 in the cooperation application 310 transmits the biometric authentication request to the authenticator 320. The biometric authentication request includes Auth biometric authentication parameters. The Auth biometric authentication parameters will be described below.

FIG. 10B is a diagram illustrating an example of the Auth biometric authentication parameters.

Auth biometric authentication parameters 1010 are constituted of the biometric authentication parameters 1000, a service ID 1011, and a Web Origin 1012. The biometric authentication parameters 1000 are the same as the biometric authentication parameters 1000 received in Step S904 from the service 370. The service ID 1011 and the Web Origin 1012 are the same as the service ID and the Web Origin of the Auth registration parameters 720 in FIG. 7B.

Description will be provided by referring again to FIG. 9. In Step S905, the biometric information request unit 324 in the authenticator 320 requests biometric information for the user. A screen (not shown) for requesting the user to input the biometric information is displayed at the time of requesting the biometric information. In Step S906, the service authentication processing unit 323 in the authenticator 320 performs the biometric authentication. That is to say, the biometric information acquired in Step S905 is collated with the biometric information stored in the TPM 206.

To be specific, the service authentication processing unit 323 determines whether there is a record having a feature quantity coinciding with that of the biometric information acquired in Step S905 in the biometric information ID column in the service authentication information management table (i.e. Table B). The feature quantity for the biometric information is obtained by converting a feature quantity unique to an individual such as a fingerprint pattern/an iris form/a vein type/a voice into a value which does not impair uniqueness.

In the biometric authentication, an individual is identified using a feature quantity unique to the individual. When the biometric authentication fails, the cooperation application 310 is notified that the authentication has failed and the cooperation application 310 displays an error message (not shown) indicating that the biometric authentication has failed to the user. In FIG. 9 shows a case the biometric authentication has succeeded. In Step S907, the service authentication processing unit 323 creates an Assertion. The Assertion is data used for verifying the fact that the user has not performed an unauthorized request in the service 370. The Assertion will be described below.

FIG. 10C is a diagram illustrating an example of the Assertion. The Assertion 1020 is constituted of an authentication information ID 1021 and a signature 1022. A procedure in which the service authentication processing unit 323 acquires the authentication information ID 1021 and the signature 1022 constituting the Assertion 1020 and creates the Assertion 1020 will be described below.

In Step S906 described above, the service authentication processing unit 323 in the authenticator 320 collates the biometric information acquired through a screen displayed in Step S905 with the biometric information stored in the TPM 206. A characteristic point extraction method, a pattern matching method, and the like are used as a collation algorithm. However, in the present invention, the collation algorithm is not particularly limited.

To be specific, the service authentication processing unit 323 identifies a record from the service authentication information management table (i.e. Table B) managed by the service authentication information storing unit 326 on the basis of the acquired biometric information. Since the biometric information ID indicating the acquired biometric information is identified, an authentication information ID 1021 and a private key corresponding to the biometric information are identified in the service authentication information management table (i.e. Table B). That is to say, when the authenticator 320 performs the biometric authentication and the biometric authentication succeeds, a private key is taken.

Also, the service authentication processing unit 323 creates a signature 1022 (or signature data) by encrypting the Assertion challenge 1001 included in the Auth biometric authentication parameters 1010 using the identified private key. Furthermore, the service authentication processing unit 323 creates an Assertion 1020 including the identified authentication information ID 1021 and the created signature 1022.

Description will be provided by referring again to FIG. 9. In Step S908, the service authentication processing unit 323 returns the Assertion 1020 created in Step S907 to the cooperation application 310. In Step S909, the communication unit 312 in the cooperation application 310 transmits the Assertion 1020 to the server 102.

In Step S910, the authenticator information processing unit 372 in the service 370 authenticates the validity of the Assertion 1020 received in Step S909. To be specific, the authenticator information processing unit 372 decrypts the signature 1022 included in the Assertion 1020 using a public key capable of being identified using the authentication information ID 1021 included in the Assertion 1020.

Also, verification is performed concerning whether the decrypted value coincides with the Assertion challenge 1001 included in the biometric authentication parameters 1000 created in Step S902. When identifying the public key, the authenticator information management table (i.e. Table E) is used. In Step S911, the token management unit 377 in the service 370 issues a token to the user who has verified the Assertion 1020 in Step S910 and stores information related to the token in the token management table (i.e. Table F).

In Step S912, the communication unit 373 in the service 370 returns the token issued in Step S911 to the cooperation application 310. In subsequent processing, the cooperation application 310 can use a function provided by the service 370 by including the token received in Step S912 in a request sent to the service 370.

Second Embodiment

In the first embodiment, a case in which the number of pieces of biometric information required at the time of registering an authenticator is one has been described. On the other hand, in this embodiment, a case in which a biometric authentication using a plurality of pieces of biometric information required from a service 370 in a server 102 at the time of registering an authenticator will be described. Constituent elements which are different from those of the first embodiment will be described with reference to FIGS. 6, 7, 11, and 12.

In a process of registering an authenticator 320 in a service 370 illustrated in FIG. 6, a process of creating registration parameters in Step S606 and a process of creating a credential in Step S609 are different from those of the first embodiment. In Step S606, an authenticator information processing unit 372 in the service 370 creates registration parameters 700. Here, this embodiment and the first embodiment differ in that a type of biometric authentication required for the authenticator 320 is designated for an authentication extension region 704 in the registration parameters 700 created in this embodiment.

For example, when the service 370 requests a fingerprint authentication and a face authentication, an authentication extension region 704 stores the following information.

{'biometrics': ['fingerprint,' 'face']}

In this way, the service 370 requests registration of a plurality of pieces of biometric information from the authenticator 320 using the authentication extension region 704.

In Step S609, an authenticator registration processing unit 321 in the authenticator 320 creates a credential 740. Here, a credential creation process performed in this embodiment will be described.

Figure 11:
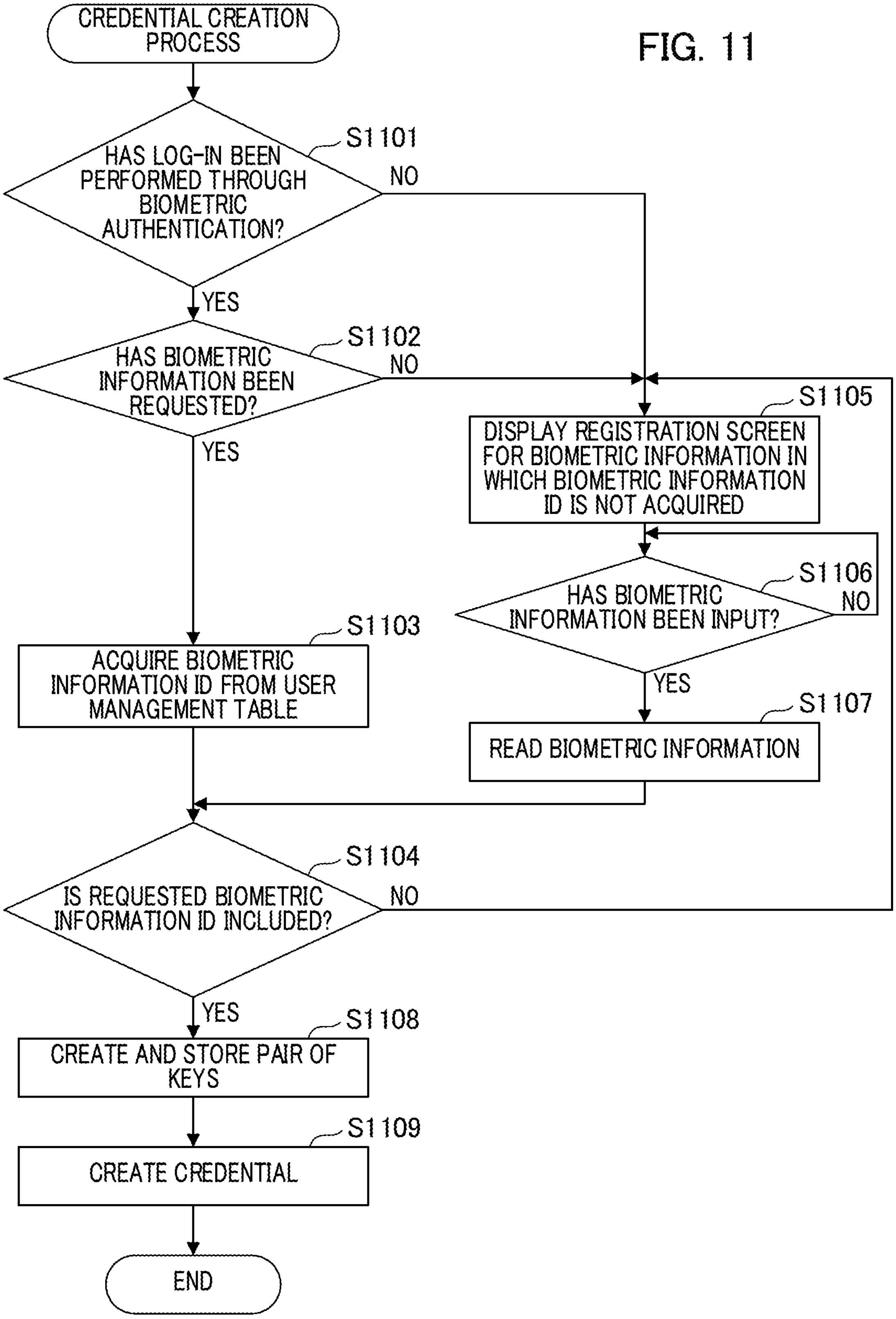
FIG. 11 is a flowchart showing a credential creation process according to a second embodiment.

FIG. 11 is a flowchart for describing the credential creation process performed by the authenticator 320 in this embodiment.

Step S1101 is the same process as Step S801 in the credential creation process of the first embodiment illustrated in FIG. 8. The authenticator registration processing unit 321 determines whether the user has logged into a mobile terminal 101 using a biometric authentication via a terminal user authentication processing unit 322. When the user has logged-in using the biometric authentication, the process proceeds to a process of Step S1102 and when the user has not logged-in using other than the biometric authentication, the process proceeds to a process of Step S1105.

In Step S1102, the authenticator registration processing unit 321 determines whether a type of biometric information used by the user for log-in to the mobile terminal 101 coincides with a type of biometric information designated in the authentication extension region 704 of the registration parameters 700 created in Step S606. The type of biometric information used by the user for log-in to the mobile terminal 101 can be obtained from a value of the authentication method column of a record in which a value of the log-in state column is "logged-in" from the terminal user information table (i.e. Table A) via the terminal user authentication processing unit 322.

When it is determined that the type of biometric information used in the logging-in coincides with the type of biometric information designated in the authentication extension region 704, the process proceeds to a process of Step S1103 and when it is determined that the type of biometric information used in the logging-in does not coincide with the type of biometric information designated in the authentication extension region 704, the process proceeds to a process of Step S1105. In Step S1103, the authenticator registration processing unit 321 acquires a biometric information ID of the user who has logged-in using the biometric authentication from the terminal user information table (i.e. Table A) via the terminal user authentication processing unit 322.

In Step S1104, the authenticator registration processing unit 321 determines whether the biometric information ID corresponding to the type of biometric information designated in the authentication extension region 704 of the registration parameters 700 created in Step S606 has been acquired. For example, it may be assumed that the type of biometric information used at the time of logging in the mobile terminal 101 is fingerprint information and the type of biometric information designated in the authentication extension region 704 of the registration parameters 700 created in Step S606 is fingerprint information and facial information. In this case, it is determined that a biometric information ID corresponding to the facial information cannot be acquired.

When it is determined that the biometric information ID has been acquired, the process proceeds to a process of Step S1108 and when it is determined that the biometric information ID has not been acquired, the process proceeds to a process of Step S1105. In Step S1105, the biometric information request unit 324 displays a request screen for biometric information which prompts the user to input biometric information.

Figure 12:
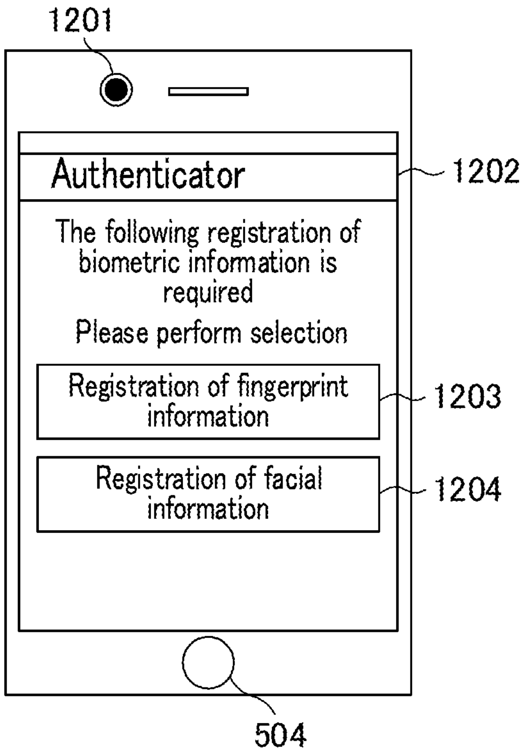
FIG. 12 is a diagram illustrating an example of a UI displayed by a mobile terminal in the second embodiment.

FIG. 12 is a diagram illustrating an example of the request screen for biometric information.

A request screen 1202 is a UI displayed by the biometric information request unit 324 in the authenticator 320. The request screen 1202 is constituted of a button 1203 and a button 1204. The button 1203 is a button for requesting the user to register fingerprint information. When the pushing of the button 1203 is detected, the biometric information request unit 324 transits to a consent screen 590 in FIG. 5D which prompts the user to input biometric information.

Also, when the above-described button 504 is touched by the user's finger, fingerprint information is read by a biometric information sensor 208. When the biometric information ID corresponding to the fingerprint information has already been acquired, the button 1203 is not displayed on the request screen 1202. The button 1204 is a button for requesting the user to register facial information.

The biometric information request unit 324 starts up a camera 1201 when the pushing of the button 1204 is detected, and then reads facial information. The camera 1201 includes the biometric information sensor 208 and the authenticator 320 acquires facial information read by the camera 1201. When the biometric information ID corresponding to the facial information has already been acquired, the button 1204 is not displayed on the request screen 1202.

The request screen 1202 is merely an example and the present invention is not limited thereto. A button for registering other pieces of biometric information which are not the button 1203 and the button 1204 may be displayed on the request screen 1202. A registration button corresponding to a type of biometric information designated in the authentication extension region 704 of the registration parameters 700 created in Step S606 is displayed on the request screen 1202.

Description will be provided by referring again to FIG. 11. In Step S1106, the biometric information request unit 324 monitors an input of the biometric information until the input via the button 504, the camera 1201, and the like. When the biometric information has been input, the process proceeds to a process of Step S1107. In Step S1107, the biometric information request unit 324 creates a feature quantity of the biometric information read by the biometric information sensor 208 included in the button 504, the camera 1201, or the like and a biometric information ID for uniquely identifying the biometric information.

In Step S1108, the authenticator registration processing unit 321 creates a pair of a private key and a public key. Moreover, the authenticator registration processing unit 321 stores various kinds of pieces of information in a service authentication information management table (i.e. Table G) stored in a TPM 206 using the service authentication information storing unit 326. The various kinds of pieces of information stored in the service authentication information management table will be described below using Table G in this embodiment.

TABLE G

Service authentication information management table

| Authentication information ID | Service ID | Private key | Authentication method | Biometric information ID |
|---|---|---|---|---|
| 407c-8841-79d | service.com | 1faea2da-a269-4fa7-812a-509470d9a0cb | fingerprint | d493a744 |
| 407c-8841-79d | service.com | 1faea2da-a269-4fa7-812a-509470d9a0cb | Face | 8ac65ba5 |
| 4c04-428b-a7a2 | service.com | D7ae30c8-3775-4706-8597-aaf681bc30f5 | fingerprint | dcc97daa |
| 92b2-498d-bea6 | print.com | 36ae5eed-732b-4b05-aa7b-4dddb4be3267 | fingerprint | 51caacaa |
| . . . | . . . | . . . | . . . | . . . |

A service authentication information management table in Table G is a table which stores various kinds of pieces of information included in authentication information in this embodiment. The service authentication information management table illustrated in Table B in the first embodiment and that of Table G differ in that an authentication method column is added to Table G The authentication method column stores a type of biometric information used at the time of creating authentication information.

For example, if the type of biometric information designated in the authentication extension region 704 of the registration parameters 700 created in Step S606 is fingerprint information and facial information, in Step S1108, two entries are written as illustrated in the first and second lines in Table G. Values in the authentication method column and the biometric information ID column are different in the two entries. That is to say, in this embodiment, when a plurality of types of biometric authentication are designated in the registration parameters 700, an authentication information ID and a public key of a plurality of credentials created on the basis of the registration parameters 700 use a common value.

In this way, when two or more types of biometric authentication are requested at the time of authentication in a service in which an authenticator is to be registered, an authentication information ID and a private key for a corresponding entry are set to a common value in the service authentication information management table. Thus, it is seen that a plurality of biometric authentications are required in a target service. In the example illustrated in Table G, it can be determined that a fingerprint authentication and a face authentication are required for a service ID "service.com" as illustrated in a first entry and a second entry Also, since common authentication information ID and private key are used in a plurality of entries, a common public key corresponding to the private key is used. That is to say, in Step S610, a credential returning to the service 370 is a common credential for the plurality of entries in the service authentication information management table, that is table G.

Description will be provided by referring again to FIG. 11. In Step S1109, the authenticator registration processing unit 321 creates a credential 740 and the process illustrated in FIG. 11 ends.

In this way, according to this embodiment, even when an authenticator is registered for a service which requests a biometric authentication using a plurality of pieces of biometric information, it is possible to reduce a load associated with registration work of the user using the biometric information presented when the user has logged into the mobile terminal 101.

Other Embodiments

Embodiment(s) of the present invention can also be realized by a computer of the system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory apparatus, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-225133, filed Nov. 22, 2017, which is hereby incorporated by reference wherein in its entirety.

What is claimed is:

1. An information processing apparatus comprising:

a storage having a tamper resistance configured to store user's biometric information required when authentication processing is performed;

a biometric information sensor configured to read biometric information of a user;

a memory configured to store instructions; and a processor configured to execute the instructions to cause the information processing apparatus to:

execute a log-in processing of the user to log the user into the information processing apparatus according to one of a plurality of authentication methods comprising biometric authentication, using biometric information of the user read by the biometric information sensor and the user's biometric information stored in the storage;

display a screen for requesting the user to present biometric information in accordance with a request from a service on a network, wherein the request includes service information corresponding to the service on the network;

create first identification information for identifying biometric information read by the biometric information sensor in accordance with the displayed screen;

create a private key required at the time of using the service on the network, and a first public key corresponding to the private key;

store the created private key and the service information in the storage associated with the first identification information;

issue a request for registering the public key in the service on the network;

acquire, in a case where the biometric authentication has been performed in the log-in processing, second identification information for identifying the user's biometric information used at the time of the log-in processing according to the request; and store the created private key and the service information in the storage associated with the acquired second identification information.

2. The information processing apparatus according to claim 1, wherein the screen is displayed when the biometric authentication is not performed in the log-in processing.

3. The information processing apparatus according to claim 1, wherein the screen is displayed when information required for the biometric authentication has been designated from the service on the network.

4. The information processing apparatus according to claim 1, wherein the screen is displayed for requesting the presentation of biometric information which differs from the biometric information read at the time of the log-in processing when the user is requested to present a plurality of pieces of biometric information responding to a request from the service on the network.

5. The information processing apparatus according to claim 1, wherein the processor is further configured to execute the instructions to cause the information processing apparatus to:

create signature data using the private key stored in the storage associated with identification information of biometric information used for the biometric authentication and parameters received from the service on the network, when the biometric authentication using the biometric information read by the biometric information sensor succeeds at the time of using the service on the network, wherein the created signature data is verified by using the public key in the service on the network.

6. The information processing apparatus according to claim 1, wherein the processor is further configured to execute the instructions to cause the information processing apparatus to:

manage a log-in state of the user to the information processing apparatus and an authentication method used in the user's log-in process.

7. The information processing apparatus according to claim 1, wherein the processor is further configured to execute the instructions to cause the information processing apparatus to:

in a case where biometric authentication using a plurality of pieces of biometric information is requested according to the creation request from the service on the network, create a common private key and a common public key corresponding to the common private key;

store the created common private key and the service information associated with respective identifiers of the pieces of biometric information; and transmit the data for registering the common public key in the service on the network.

8. The information processing apparatus according to claim 1, wherein the information processing apparatus includes any one of a smartphone, a tablet, a wearable terminal, and a notebook type personal computer.

9. A method for an information processing apparatus including a storage having a tamper resistance configured to store user's biometric information required when authentication processing is performed and a biometric information sensor configured to read biometric information of a user, the method comprising:

executing a log-in processing of the user to log the user into the information processing apparatus according to one of a plurality of authentication methods comprising biometric authentication, using biometric information of the user read by the biometric information sensor and the user's biometric information stored in the storage;

displaying a screen for requesting the user to present biometric information in accordance with a request from a service on a network, wherein the request includes service information corresponding to the service on the network;

creating first identification information for identifying biometric information read by the biometric information sensor in accordance with the displayed screen;

creating a private key required at the time of using the service on the network, and a public key corresponding to the private key;

storing the created private key and the service information in the storage associated with the first identification information;

issuing a request for registering the public key in the service on the network;

acquiring, in a case where the biometric authentication has been performed in the log-in processing, second identification information for identifying the user's biometric information used at the time of the log-in processing according to the request; and storing the created private key and the service information in the storage associated with the acquired second identification information.

10. The method according to claim 9, further comprising:

creating signature data using the private key stored in the storage associated with identification information of biometric information used for the biometric authentication and parameters received from the service on the network, when the biometric authentication using the biometric information read by the biometric information sensor succeeds at the time of using the service on the network, wherein the created signature data is verified in the service on the network.

11. The method according to claim 9, further comprising:

in a case where biometric authentication using a plurality of pieces of biometric information is requested according to the creation request from the service on the network, creating a common private key and a common public key corresponding to the common private key;

storing the created common private key and the service information associated with respective identifiers of the pieces of biometric information; and transmitting the data for registering the common public key in the service on the network.

12. The method according to claim 9, wherein the information processing apparatus includes any one of a smartphone, a tablet, a wearable terminal, and a notebook type personal computer.

13. A non-transitory storage medium on which is stored a computer program for making a computer execute a method in an information processing apparatus comprising a storage having a tamper resistance configured to store user's biometric information required when authentication processing is performed and a biometric information sensor configured to read biometric information of a user, the method comprising:

executing a log-in processing of the user to log the user into the information processing apparatus according to one of a plurality of authentication methods comprising biometric authentication, using biometric information of the user read by the biometric information sensor and the user's biometric information stored in the storage;

displaying a screen for requesting the user to present biometric information in accordance with a request from a service on a network, wherein the request includes service information corresponding to the service on the network;

creating first identification information for identifying biometric information read by the biometric information sensor in accordance with the displayed screen;

creating a private key required at the time of using the service on the network, and a public key corresponding to the private key;

storing the created private key and the service information in the storage associated with the first identification information;

issuing a request for registering the public key in the service on the network;

acquiring, in a case where the biometric authentication has been performed in the log-in processing, second identification information for identifying the user's biometric information used at the time of the log-in processing according to the request; and storing the created private key and the service information in the storage associated with the acquired second identification information.

* * * * *